US005719222A

United States Patent [19]
Chen

[11] Patent Number: 5,719,222
[45] Date of Patent: Feb. 17, 1998

[54] WATER-BASED SYNTHETIC ADHESIVE AND METHOD FOR MAKING THE SAME

[76] Inventor: Der-Shyan Chen, No. 19-2, 2 Pin, 5 Lin, Ta Hsi Vill, Tsao Chiao Hsiang, Miao Li Hsien, Taiwan

[21] Appl. No.: 598,340

[22] Filed: Feb. 8, 1996

[51] Int. Cl.[6] .............................. C08K 5/06; C08J 11/00
[52] U.S. Cl. .................... 524/377; 524/376; 524/500; 524/501; 524/522; 524/523; 521/48
[58] Field of Search ............................ 524/377, 376, 524/500, 501, 522, 523, 504, 539; 521/48

[56] References Cited

U.S. PATENT DOCUMENTS

| | | | |
|---|---|---|---|
| 4,476,271 | 10/1984 | Kano et al. | 524/377 |
| 4,943,612 | 7/1990 | Morite et al. | 524/714 |
| 5,196,468 | 3/1993 | Schwerzel et al. | 524/376 |
| 5,548,016 | 8/1996 | Provenzola | 524/507 |

*Primary Examiner*—Joseph L. Schofer
*Assistant Examiner*—Olga Asinovsky
*Attorney, Agent, or Firm*—Browdy and Neimark

[57] ABSTRACT

A water-based synthetic adhesive is composed of the thermosetting acrylic resin and the thermoplastic resin, which are bonded together by an interfacial agent in the presence of water. The adhesive is further composed of an acidic swelling agent capable of causing the adhesive to form a number of air-permeable pores when the adhesive is subjected to heat. The adhesive is still further composed of a consistency promoting agent to facilitate the application of the adhesive. A method for making the water-based synthetic adhesive includes a step in which a mixture containing water and the thermoplastic resin powder is formed. An interfacial agent and the thermosetting acrylic resin are added to the mixture before the mixture is stirred slowly at a predetermined temperature under at least one atmospheric pressure for a predetermined time so that the mixture becomes a paste, which is then subjected to a high-speed grinding at a low temperature for a predetermined period.

15 Claims, No Drawings

1

WATER-BASED SYNTHETIC ADHESIVE AND METHOD FOR MAKING THE SAME

FIELD OF THE INVENTION

The present invention relates generally to an adhesive, and more particularly to a water-based synthetic adhesive and a method for making the water-based synthetic adhesive suitable for use in adhering the elastic objects having a relatively high softness.

BACKGROUND OF THE INVENTION

There are a variety of adhesives available in the market today; nevertheless they are generally grouped into two categories: the thermosetting adhesives which become hard and rigid when subjected to heat, and the thermoplastic adhesives which become or remain soft and moldable when subjected to heat. The thermosetting adhesives are mainly composed of the thermosetting resin and are therefore less susceptible to the environmental elements. However, the thermosetting adhesives are not suitable for use in adhering the elastic and soft objects in view of the fact that the thermosetting adhesives become hard and rigid when subjected to heat. On the contrary, the thermoplastic adhesives are mainly made up of the thermoplastic resin and are rather susceptible to the enviromental elements. In other words, the adhesions of the thermoplastic adhesives are greatly undermined when the thermoplastic adhesives are exposed to a high-temperature or high-moisture environment in which the thermoplastic adhesives are reactivated easily.

The adhesives described above are sold in the market in the liquid form and the solid form. The adhesives sold in the liquid form are generally composed of a main ingredient, such as resin or rubber, which is dissolved in an appropriate chemical solvent. Such liquid adhesives as described above can be easily applied on the objects intended to be adhered; nevertheless the liquid adhesives contain chemical solvent which is hazardous to human health. On the other hand, the solid adhesives are hot melt adhesives containing a thermoplastic polymer as their chief component. The solid adhesives are devoid of water and solvent and exist in various irregular forms, such as flakes, grains, strips, blocks, curled filaments, etc. The cost of using the solid adhesives is relatively high in view of the fact that the solid adhesives must be first melted, and that they are applied on the objects by a special applicator, such as a hot melt gun or hot melt applicator.

SUMMARY OF THE INVENTION

It is therefore the primary objective of the present invention to provide a water-based synthetic adhesive capable of overcoming the shortcomings of the conventional adhesives currently available in the market. The water-based synthetic adhesive of the present invention is resistant to heat and ageing and is suitable for use in adhering the elastic and soft objects.

It is another objective of the present invention to provide a water-based synthetic adhesive, which is devoid of the chemical solvent and can be easily applied on the objects intended to be adhered.

It is still another objective of the present invention to provide a water-based synthetic adhesive, which has a relatively greater peel strength as compared with the conventional adhesives currently available in the market.

It is still another objective of the present invention to provide a water-based synthetic adhesive, which is highly permeable to air and is therefore suitable for use in adhering the breathable objects like fabrics.

It is still another objective of the present invention to provide a cost-efficient method for making the water-based synthetic adhesive of the present invention.

The water-based synthetic adhesive of the present invention is composed of: 25–90% by weight of a water-based thermosetting acrylic resin with the solid content ranging between 35% and 55% and with the viscosity in the range of 400–800 CPS; less than 45% by weight of the comminuted thermoplastic resin having a particle size under 350 microns and a melting point ranging between 50° C. and 230° C.; 0.5–1.0% by weight of an interfacial agent having an HLB (hydrophilic lipophilic balance) in the range of between 3 and 6 for binding the molecules of the thermosetting acrylic resin and the thermoplastic resin; and an appropriate quantity of water to attain the equilibrium of the thermosetting acrylic resin and the thermoplastic resin, and to prepare the concentration and the flowability of the adhesive.

The adhesive of the present invention is different from the adhesives of the prior art in that the former is composed of the thermosetting acrylic resin having an appropriate solid content, and of the comminuted thermoplastic resin having a particle size smaller than a limited value, so as to enable them to be dissolved in water. That is to say that the synthetic adhesive of the present invention contains no chemical solvent. Moreover, the water-based synthetic adhesive of the present invention is an innovative product resulted from the technical breakthrough of the present invention making use of an interfacial agent having an appropriate hydrophilic lipophilic balance ranging between 3 and 6. The interfacial agent serves to bind the molecules of the thermosetting acrylic resin and the thermoplastic resin, which are different from each other in physical properties.

The water-based synthetic adhesive of the present invention further consists of 0.5–1.0% by weight of a swelling agent at pH ranging between 4 and 7. The swelling agent serves to promote the softening and the swelling of the surfaces of the objects intended to be adhered so as to enable the adhesive to penetrate into the inner areas of the surfaces of the objects. The swelling agent can be caused to form a plurality of air-permeating pores when subjected to heating and drying.

The water-based synthetic adhesive still further consists of 3.0–5.0% by weight of a powdered natural rubber having a particle size smaller than 350 microns. The addition of the powdered natural rubber to the adhesive of the present invention is intended to bring about an increase in the softness of the surfaces of the adhered objects.

In order to moderate the flowability of the adhesive of present invention for easy application, the adhesive of the present invention is composed of 0.05–0.2% by weight of a consistency promoting agent containing cellulose.

The adhesive of the present invention is further composed of a biocide in parts per million(ppm) for inhibiting the growth of the bacteria and the fungi on the surfaces of the adhered objects.

The method for making the water-based synthetic adhesive comprises a first step in which a predetermined amount of water is mixed with 45% or less by weight of the comminuted thermoplastic resin to form a mixture, to which 0.5–1.0% by weight of an interfacial agent and 25–90% by weight of the thermosetting acrylic resin are added in that order before the swelling agent and the powdered natural rubber are added to the mixture. The mixture containing the water, the thermoplastic resin, the thermosetting resin, the swelling agent and the natural rubber is then stirred slowly at a temperature ranging between 80° C. and 85° C. under at least one atmospheric pressure for a predetermined period until the mixture becomes a paste having a viscosity of at least 800 CPS. The paste is subsequently subjected to a high-speed grinding for a predetermined period to become the water-based synthetic adhesive of the present invention. For a specific purpose, the adhesive so made may be added thereto a predetermined amount of the consistency promoting agent and the water such that the adhesive has a viscosity ranging between 6000 and 8000 CPS and that the adhesive is allowed to set undisturbed for a predetermined period.

DETAILED DESCRIPTION OF THE INVENTION

The features of the present invention will be more readily understood upon a thoughtful deliberation of the following detailed description of a preferred embodiment of the present invention.

The adhesive of the preferred embodiment of the present invention is rather suitable for use in adhering fabrics and polyurethane (PU) foam cotton and is composed of: 35% by weight of the aqueous thermosetting acrylic resin with solid content of 40% and a viscosity of 600 CPS; 30% by weight of the comminuted polyester resin having a particle size of 300 microns and a melting point of 120° C.; 3% by weight of the powdered natural rubber having a particle size of 300 microns; 1% by weight of polyoxyethylene alkyl ether, a non-ionic surfactant, having an HLB of 5 and serving as a bridging agent for bonding the thermosetting acrylic resin and the polyester resin; 1% by weight of a swelling agent which has a pH value of 5.8 and is composed of polyoxyethylene sec-alcohol ether and acetic acid for causing the swelling of the surfaces of the adhered objects so as to enable the adhesive of the present invention to penetrate deep into the inner portion of the surfaces of the adhered objects for enhancing the adhesion effect of the adhesive of the present invention; 0.1% by weight of methyl cellulose, ethyl cellulose or hydroxyethyl cellulose, which is used as a consistency promoting agent for preparing the adhesive in such a manner that the adhesive of the present invention has viscosity of 8000 CPS so as to facilitate the application of the adhesive of the present invention; 200 parts per million of 2,4-dichloro-3,5xylenol or 5-bromo-5-nitro-1, 3-dioxane, which is used to act as a biocide for inhibiting the growth of the bacteria or the fungi on the surfaces of the adhered objects, especially the component parts of a shoe; and an appropriate quantity of water, which is pretreated with ethylene diamine tetraacetic acid (E.D.T.A.) for controlling the minerals contained in the water, and is intended to attain the reaction equilibrium of each of the ingredients of the adhesive of the present invention and to adjust the concentration and the flowability of the adhesive of the present invention.

The adhesive of the present invention described above is prepared by a method comprising the steps of:

(a) grinding a recycled article of polyester resin (which has a melting point of 120° C.) at a low temperature, such as 40° C. below zero, into a polyester resin powder having a particle size of 300 microns of less;

(b) mixing 30% by weight of the polyester resin powder with an appropriate quantity of water pretreated with E.D.T.A. to form a mixture;

(c) adding to the mixture 1% by weight of polyoxyethylene alkyl ether having an HLB of 5 and a particle size of 300 microns, 3% by weight of the powdered natural rubber, 1% by weight of a swelling agent which has a pH value of 5.8 and is composed of polyoxyethylene sec-alcohol ether and acetic acid, and 35% by weight of the thermosetting acrylic resin with a solid content of 40% and a viscosity of 600 CPS, so as to form a mixture agent;

(d) stirring the mixture agent at a constant temperature ranging between 82° C. and 85° C. under one atmospheric pressure and at a speed of 80 rpm for 24 hours, so as to cause the mixture agent to become a white paste having a viscosity of about 800 CPS;

(e) grinding the white paste at a temperature of 15° C. and at a speed of at least 7500 rpm for 30 minutes, so as to cause the white paste to become a ground paste;

(f) adding to the ground paste 200 parts per million of 2,4-dichloro3,5-xylenol, 0.1% by weight of methyl cellulose, and an appropriate amount of the water pretreated with E.D.T.A., so as to cause the ground paste to become a gluey paste having a viscosity ranging between 6000 and 8000 CPS; and (g) setting the gluey paste without any disturbance for 36 hours to allow the gluey paste to become the water-based synthetic adhesive of the present invention.

It must be emphasized here that the adhesive of the present invention is composed of the thermosetting resin and the thermoplastic resin, which are bonded together by an interfacial agent having a specifically selected HLB value, and that the adhesive of the present invention is therefore provided with the characteristic qualities of both thermosetting resin and thermoplastic resin. In addition, the adhesive of the present invention is composed of a heat-sensitive acidic swelling agent, which forms a number of pores when subjected to heat. As a result, the adhesive of the present invention is suitable for use in adhering the materials permeable to air. The method for making the adhesive of the present invention is novel and unprecedented.

The embodiment of the adhesive of the present invention and the embodiment of the method for making the adhesive of the present invention, which are described above, are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A water-based, chemical solvent-free adhesive paste which is composed of:
  (a) 25–90% by weight of an aqueous thermosetting acrylic resin with a solid content ranging between 35 and 55% and with a viscosity ranging between 400 and 800 CPS;
  (b) 45% or less by weight of a comminuted thermoplastic resin having a melting point ranging between 50° C. and 230° C. and having a particle size of 350 microns or less, with the proviso that at least some amount of said thermoplastic resin be present;
  (c) 0.5–1.0% by weight of a non-ionic interfacial agent having an HLB (hydrophilic lipophilic balance) value ranging between 3 and 6 for bonding molecules of said thermosetting acrylic resin and said thermoplastic resin; and
  (d) An appropriate quantity of water for attaining an equilibrium of ingredients (a) to (c) and for adjusting a concentration and a flowability of said adhesive.

2. The adhesive as defined in claim 1 further comprising 0.5–1.0% by weight of a swelling agent having a pH value ranging between 4 and 7.

3. The adhesive as defined in claim 2, wherein said swelling agent is composed of polyoxyethylene sec-alcohol ether and acetic acid.

4. The adhesive as defined in claim 1 further comprising 3–5% by weight of a powdered natural lubber having a particle size of 350 microns or less.

5. The adhesive as defined in claim 1 further comprising 0.05–0.2% by weight of a consistency promoting agent containing cellulose.

6. The adhesive as defined in claim 5, wherein said consistency promoting agent is selected from the group consisting of methyl cellulose, ethyl cellulose, and hydroxyethyl cellulose.

7. The adhesive as defined in claim 1 further consisting of a biocide.

8. The adhesive as defined in claim 7, wherein said biocide is selected from the group consisting of 2,4-dichloro-3,5-xylenol and 5-bromo-5-nitro-1,3-dioxane.

9. The adhesive as defined in claim 1, wherein said water is pretreated with 2–3% by weight of ethylene diamine tetraacetic acid (E.D.T.A.).

10. A method for making a water based synthetic adhesive paste comprising the steps of:

(a) preparing a mixture by adding 45% or less by weight of a comminuted thermoplastic resin to water, with the proviso that at least some amount of said thermoplastic resin be present;

(b) adding to said mixture 0.5–1.0% by weight of a non-ionic interfacial agent and 25–90% by weight of a thermosetting acrylic resin before said mixture is stirred slowly at a temperature ranging between 80° C., and 85° C. under at least one atmospheric pressure for a predetermined time until said mixture becomes a paste having a viscosity of at least 800 CPS; and (c) grinding said paste at a high speed and at a temperature ranging between 10° C. and 15° C. for a predetermined time.

11. A method for preparing a water-based synthetic adhesive paste comprising the steps of:

(a) grinding discarded article of polyester resin having a melting point of 120° C. into a polyester resin powder having a particle size of 300 microns or less;

(b) mixing said polyester resin powder with water pretreated with 30% by weight of ethylene diamine tetraacetic acid to form a mixture;

(c) adding to said mixture 1% by weight of polyoxyethylene alkyl ether having a hydrophilic lipophilic balance of 5, 3% by weight of a natural rubber powder having a particle size of 300 microns, 1% by weight of a swelling agent having a pH value of 5.8 and consisting of polyoxyethylene sec-alcohol ether and acetic acid, and 35% by weight of an aqueous thermosetting acrylic resin with a solid content of 40% and a viscosity of 600 CPS, so as to cause said mixture to become an intermediate product;

(d) stirring at a speed of 80 rpm said intermediate product at a constant temperature ranging between 80° C. and 85° C. under one atmospheric pressure for 24 hours, so as to cause said intermediate product to become a white paste having a viscosity of 800 CPS;

(e) grinding at a speed of at least 7500 rpm said white paste at a temperature of 15° C. for 30 minutes such that said white paste becomes a ground paste;

(f) adding to said ground paste 200 parts per million (ppm) of 2,4-dichloro-3,5-xylenol, 0.1% by weight of methyl cellulose, and an appropriate amount of water, so as to cause said ground paste to become a gluey paste having a viscosity ranging between 6000 and 8000 CPS; and (g) setting said gluey paste without any disturbance for 36 hours so as to cause said gluey paste to become a water-based synthetic adhesive paste of the present invention.

12. The method as defined in claim 10, wherein said interfacial agent is added to said mixture along with 0.5–1.0% by weight of a swelling agent having a pH value of between 4 and 7, and 3–5% by weight of a powdered natural rubber having a particle size of 350 µm or less.

13. The method as defined in claim 10, further comprising adding to said paste after said grinding of said paste is completed, a biocide and 0.05–2.0% by weight of a consistency promoting agent containing cellulose.

14. A water-based synthetic adhesive paste according to claim 1 wherein said non-ionic interfacial agent having an HLB of 3–6 is a polyoxyethylene alkyl ether.

15. A water-based synthetic adhesive paste according to claim 1 which is chemical solvent free, and wherein said paste is aged whereby said interfacial agent constitutes means to bond molecules of said thermosetting acrylic resin to said thermoplastic resin.

* * * * *